(12) United States Patent
Kobayashi

(10) Patent No.: US 9,409,495 B2
(45) Date of Patent: Aug. 9, 2016

(54) VEHICLE APPARATUS ATTACHING STRUCTURE

(71) Applicant: NISSAN MOTOR CO., LTD., Yokohama-shi, Kanagawa (JP)

(72) Inventor: Yutaka Kobayashi, Kawasaki (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/433,261

(22) PCT Filed: Oct. 3, 2013

(86) PCT No.: PCT/JP2013/076897
§ 371 (c)(1),
(2) Date: Apr. 2, 2015

(87) PCT Pub. No.: WO2014/054715
PCT Pub. Date: Apr. 10, 2014

(65) Prior Publication Data
US 2015/0258913 A1 Sep. 17, 2015

(30) Foreign Application Priority Data

Oct. 5, 2012 (JP) .................................. 2012-223672

(51) Int. Cl.
*B60R 16/04* (2006.01)
*B60L 15/00* (2006.01)
*B60K 1/00* (2006.01)
(Continued)

(52) U.S. Cl.
CPC ................ *B60L 15/007* (2013.01); *B60K 1/00* (2013.01); *B60K 1/04* (2013.01); *B60L 11/14* (2013.01); *B60L 11/1803* (2013.01); *B60L 11/1868* (2013.01); *B60L 11/1877* (2013.01); *B60L 11/1879* (2013.01); *B60L 11/1887* (2013.01); *B60R 16/04* (2013.01); *B60K 2001/0411* (2013.01); *B60L 2210/40* (2013.01); *B60L 2270/145* (2013.01); *B60Y 2304/01* (2013.01); *Y02T 10/645* (2013.01); *Y02T 10/70* (2013.01); *Y02T 10/7066* (2013.01);
(Continued)

(58) Field of Classification Search
CPC ....... B60L 15/007; B60L 11/00; B60L 11/18; B60L 11/1812; B60L 2210/40; B60K 1/00; B60K 1/04; B60K 2001/0411; B60R 16/04; B60R 16/033
See application file for complete search history.

(56) References Cited

U.S. PATENT DOCUMENTS 5,476,151 A * 12/1995 Tsuchida ................. B60K 1/00
180/274
5,994,789 A * 11/1999 Ochiai ................ B60L 11/1803
180/65.1
(Continued)

FOREIGN PATENT DOCUMENTS

JP 2011-121429 A 6/2011
JP 2012166653 A 9/2012

*Primary Examiner* — James M Dolak
(74) *Attorney, Agent, or Firm* — Young Basile Hanlon & MacFarlane, P.C.

(57) ABSTRACT

An inverter attachment unit including an inverter is attached to a vehicle body. In addition, an auxiliary battery attachment unit including an auxiliary battery is attached to the vehicle body so that the auxiliary battery attachment unit may be adjacent to the inverter attachment unit. When the auxiliary battery attachment unit is attached to the vehicle body, attachment portions by which the inverter attachment unit is attached to the vehicle body are covered with the auxiliary battery attachment unit.

3 Claims, 10 Drawing Sheets

(51) Int. Cl.
  *B60L 11/14*     (2006.01)
  *B60L 11/18*     (2006.01)
  *B60K 1/04*      (2006.01)

(52) U.S. Cl.
  CPC ......... *Y02T 10/7077* (2013.01); *Y02T 10/7241* (2013.01); *Y02T 90/34* (2013.01); *Y10S 903/951* (2013.01)

(56) References Cited

U.S. PATENT DOCUMENTS

| | | | | |
|---|---|---|---|---|
| 6,460,642 B1* | 10/2002 | Hirano | ................. | B60K 6/40 180/271 |
| 6,598,691 B2* | 7/2003 | Mita | ................. | B60K 1/00 180/65.1 |
| 6,828,755 B1* | 12/2004 | Iverson | ................. | H01M 16/00 320/104 |
| 7,485,983 B2* | 2/2009 | Asao | ................. | B60K 1/04 307/10.1 |
| 7,610,973 B2* | 11/2009 | Asao | ................. | B60K 6/26 180/65.21 |
| 8,616,319 B2* | 12/2013 | Yokoyama | ................. | B60K 1/04 180/68.5 |
| 8,770,326 B2* | 7/2014 | Matano | ................. | B60K 1/04 180/65.1 |
| 8,820,452 B2* | 9/2014 | Iwasa | ................. | B60K 1/04 180/68.2 |
| 8,893,843 B2* | 11/2014 | Hayano | ................. | B60L 15/007 180/232 |
| 9,156,341 B2* | 10/2015 | Matsumura et al. | | |
| 9,199,537 B2* | 12/2015 | Hotta et al. | | |
| 9,203,233 B2* | 12/2015 | Kitami et al. | | |
| 9,205,749 B2* | 12/2015 | Sakamoto | | |
| 9,254,871 B2* | 2/2016 | Hotta | ................. | B62D 21/155 |
| 9,283,838 B2* | 3/2016 | Ohashi | ................. | B60K 1/04 |
| 2009/0120661 A1* | 5/2009 | Inoue | ................. | B60K 6/52 174/110 SR |
| 2013/0270862 A1 | 10/2013 | Hotta et al. | | |

* cited by examiner

FIG. 7A
FIG. 7B
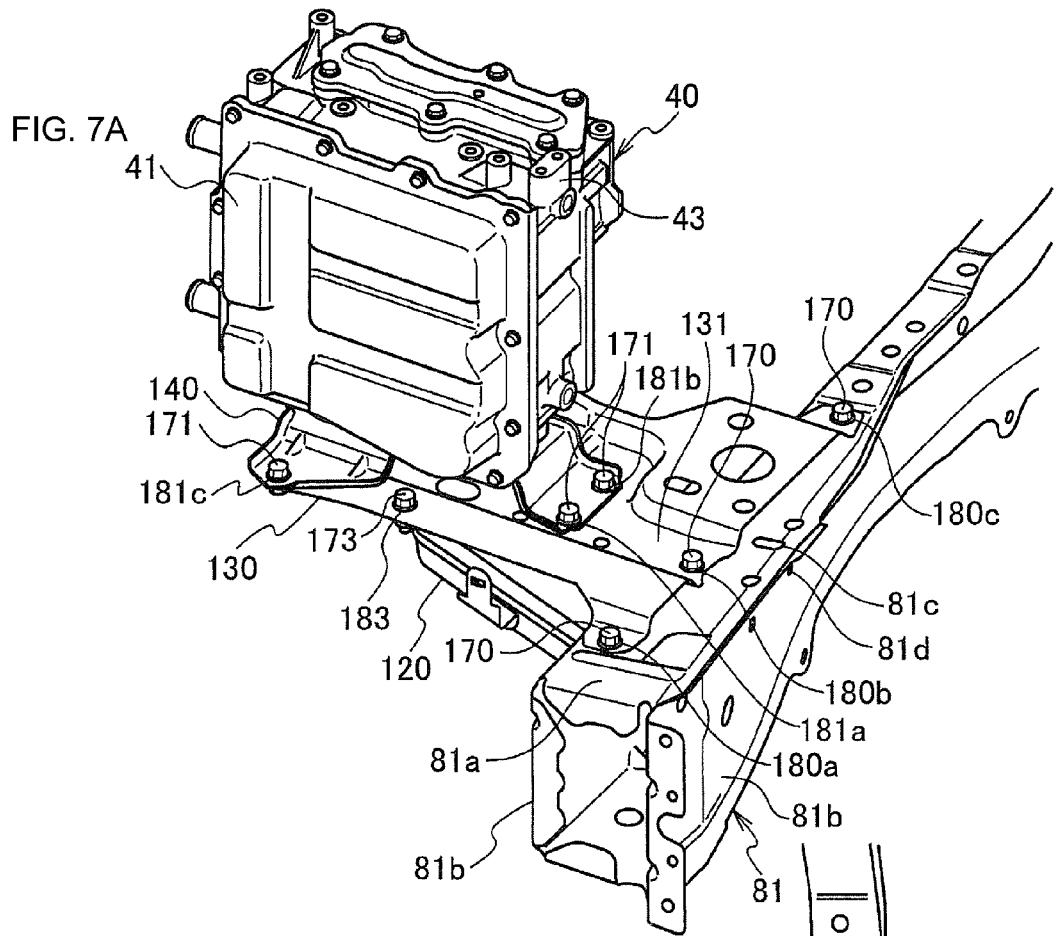
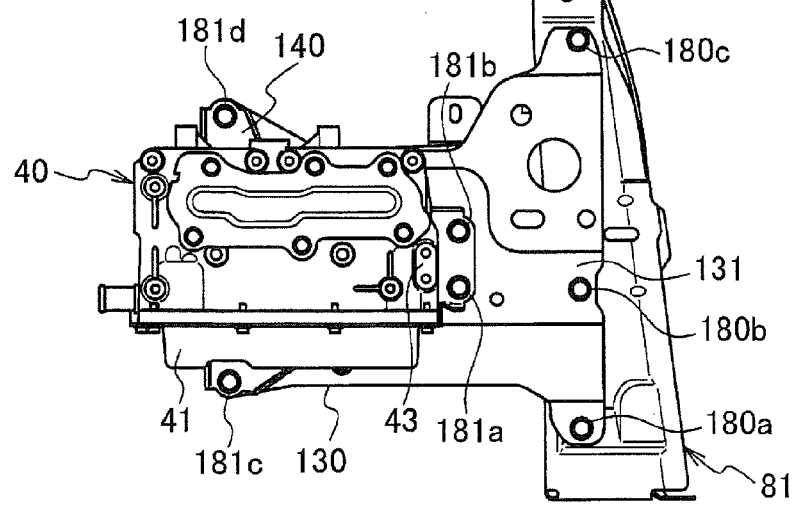

VEHICLE APPARATUS ATTACHING STRUCTURE

CROSS REFERENCE TO RELATED APPLICATION

The present application claims priority to Japanese Patent Application No. 2012-223672, filed Oct. 5, 2012, incorporated herein in its entirety.

TECHNICAL FIELD

The present invention relates to a vehicle apparatus attaching structure.

BACKGROUND

Among vehicle apparatus attaching structures is a conventionally known one which is configured to attach vehicle apparatuses, such as an inverter and an auxiliary battery, to a vehicle body (see Japanese Patent Application Publication No. 2012-166653, for example). According to Japanese Patent Application Publication No. 2012-166653, the auxiliary battery and the inverter are attached to the vehicle body in a way that makes the auxiliary battery and the inverter adjacent to each other.

Meanwhile, detachment of the inverter and the auxiliary battery from the vehicle body is usually achieved, based on a predetermined procedure.

This technique, however, uses a structure which enables either one of the inverter and the auxiliary battery to be detached earlier than the other, and, accordingly, makes the inverter and the auxiliary battery more likely to be detached by following a wrong procedure.

SUMMARY

With this taken into consideration, an object of the present invention is to provide a vehicle apparatus attaching structure which ensures that the vehicle apparatuses can be detached more securely by following an appropriate procedure.

A vehicle apparatus attaching structure according to the present invention is one which enables vehicle apparatuses to be attached to a vehicle body. Its most principal feature is as follows. The vehicle apparatuses include: an inverter configured to convert direct-current electric power, supplied from an electric power supply unit, into alternating-current electric power; and an auxiliary battery connected to the inverter, and configured to supply electric power to the inverter. An inverter attachment unit including the inverter is attached to the vehicle body, and an auxiliary battery attachment unit including the auxiliary battery is attached to the vehicle body so that the auxiliary battery attachment unit may be adjacent to the inverter attachment unit. The auxiliary battery attachment unit is attached to the vehicle body such that an attachment portion by which the inverter attachment unit is attached to the vehicle body is covered with the auxiliary battery attachment unit.

According to the present invention, the auxiliary battery attachment unit is designed to be attached to the vehicle body so that the auxiliary battery attachment unit may be adjacent to the inverter attachment unit. In this respect, the attachment portion by which the inverter attachment unit is attached to the vehicle body is designed to be covered with the auxiliary battery attachment unit. For this reason, it is possible to check the inverter attachment unit from being detached while the auxiliary battery attachment unit still remains attached. As a result, it is possible to detach the auxiliary battery attachment unit and the inverter attachment unit more securely by following an appropriate procedure.

BRIEF DESCRIPTION OF DRAWINGS

FIG. 3A is a perspective view, and FIG. 3B is a plan view.

FIG. 5A is a perspective view, and FIG. 5B is a plan view.

FIGS. 7A and 7B depict views showing how an inverter is attached to the second bracket according to the embodiment of the present invention. FIG. 7A is a perspective view, and FIG. 7B is a plan view.

FIG. 9A is a perspective view, and FIG. 9B is a plan view.

DESCRIPTION OF EMBODIMENTS

Detailed descriptions will be herein below provided for an embodiment of the present invention by using the drawings.

Figure 1:
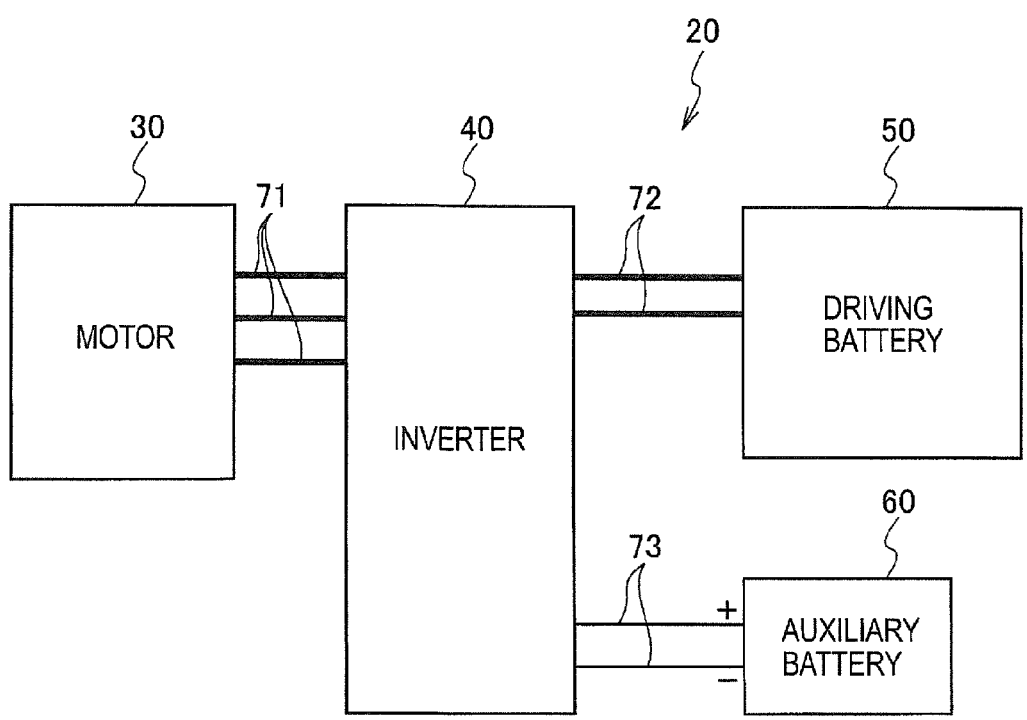
FIG. 1 is a diagram schematically showing a connecting relationship in a motor driving system installed in a vehicle according to an embodiment of the present invention.

A motor driving system 20 including a motor 30 is installed in a vehicle 10 of the embodiment (see FIG. 1). In other words, the vehicle 10 uses the motor 30 as a driving source. Vehicles of this type include: electric vehicles driven by driving force of a motor; hybrid vehicles using a motor and an engine as an internal combustion engine in combination; and fuel cell vehicles driven by electric power which is generated by a fuel cell.

Figure 2:
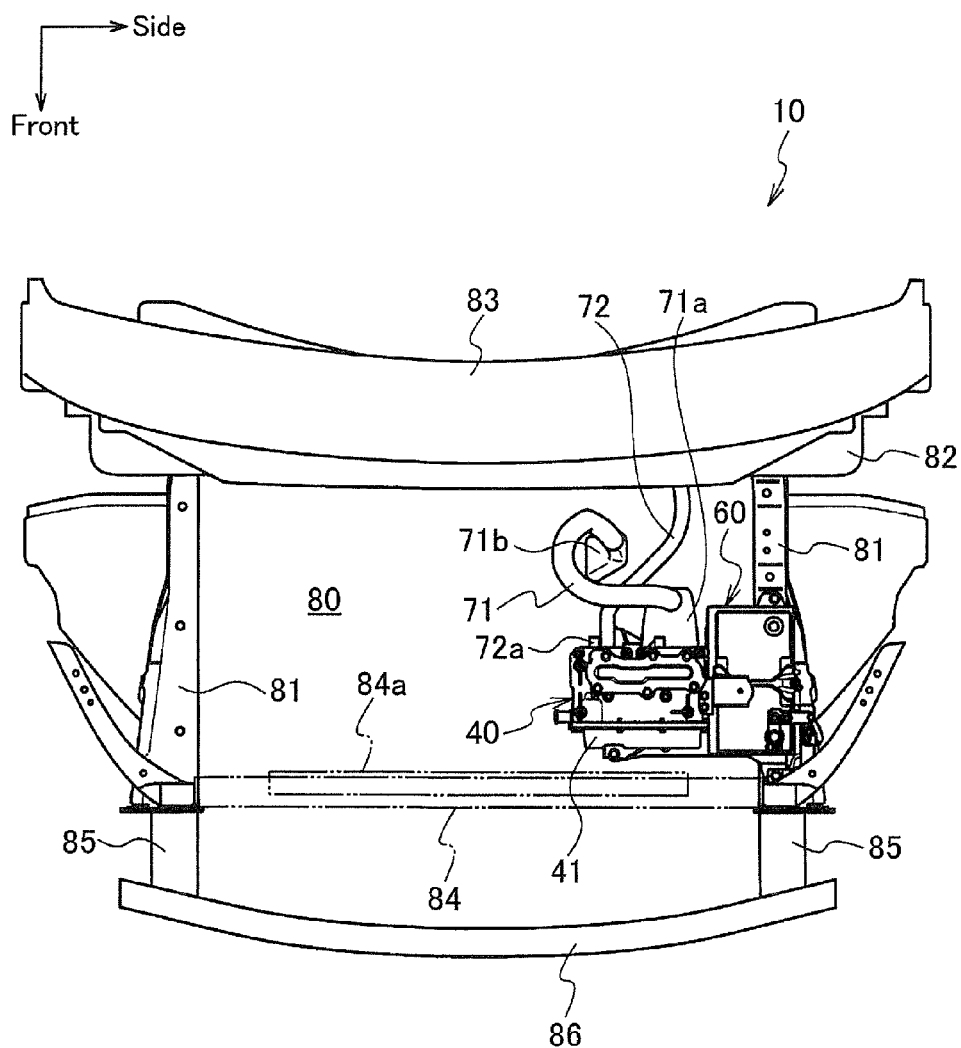
FIG. 2 is a plan view schematically showing a structure of a front section of the vehicle according to the embodiment of the present invention.

As shown in FIG. 1, the motor driving system 20 includes the motor 30 which is connected to the driving wheels (not illustrated) and transmits driving force to the driving wheels. An inverter 40 is electrically connected to the motor 30 via a first harness 71. A driving battery (electric power supply unit) 50 is electrically connected to the inverter 40 via a second harness 72. It should be noted that, as shown in FIG. 2, AC connectors 71a, 71b are connected to both ends of the first harness 71. The motor 30 and the inverter 40 are electrically connected together by: connecting the AC connector 71a to the inverter 40, and the connector 71b to the motor 30. In addition, a DC connector 72a and a DC connector (not illustrated) are connected to both ends of the second harness 72. The inverter 40 and the driving battery (electric power supply unit) 50 are electrically connected together by: connecting the DC connecter 72*a* to the inverter 40, and the DC connector (not illustrated) to the driving battery (electric power supply unit) 50.

The inverter 40 is a power converter including a power supply circuit for electrically generating alternating-current electric power from direct-current electric power (and direct-current electric power from alternating-current electric power). In the embodiment, the inverter 40 converts direct-current electric power, which is supplied from the driving battery (electric power supply unit) 50 formed from a fuel cell or the like, to alternating-current electric power, and supplies the thus-converted supply power to the motor 30. Thereby, the motor 30 is driven.

In addition, an auxiliary battery 60 is connected to the inverter 40 via a third harness 73. The inverter 40 is driven, using electric power which is supplied from the auxiliary battery 60. Incidentally, connectors (not illustrated) are connected to the two respective ends of the third harness 73 as well. The inverter 40 and the auxiliary battery 60 are electrically connected together by connecting the connectors to the inverter 40 and the auxiliary battery 60, respectively.

The motor 30, the inverter 40 and the auxiliary battery 60 in the motor driving system 20 like this are usually disposed inside a front compartment 80 formed in the front section of the vehicle 10. On the other hand, the driving battery (electric power supply unit) 50 is disposed in a rear floor (not illustrated) in the rear section of the vehicle 10.

This embodiment is exemplified by the case where: the motor 30, the inverter 40 and the auxiliary battery 60 are disposed inside the front compartment 80, while the driving battery (electric power supply unit) 50 is disposed in the rear section of the vehicle 10. Incidentally, the locations for the placement of the members constituting the motor driving system 20 are not limited to the above-mentioned ones, but may be set as appropriate.

As shown in FIG. 2, the upwardly-opened front compartment 80 for housing the members of the motor 30 and the like is formed in the front section of the vehicle 10. The upper opening of the front compartment 80 is openably closed by a hood (not illustrated).

Two sides of the front compartment 80 in the vehicle width direction are defined by front side members 81, 81 extending in the vehicle front-rear direction. A rear end portion of the front compartment 80 is defined separately from a vehicle compartment (not illustrated) by a dash panel 82 which extends in the upward-downward direction and in the vehicle widthwise direction. Incidentally, a cowl box 83 extending in the vehicle widthwise direction along a rear edge of the front compartment 80 is provided in the rear of the front compartment 80. The cowl box 83 is joined to an upper end of the dash panel 82, and is to introduce external air to the vehicle compartment (not illustrated).

A radiator core support 84 extending in the vehicle widthwise direction is disposed in a vehicle front end portion (a lower portion shown in FIG. 2) of the front compartment 80. A radiator 84*a*, an evaporator (not illustrated) and the like for an air conditioner as well as other various accessories are set on the radiator core support 84.

In addition, two end portions of a bumper reinforcement 86 of a front bumper in the vehicle widthwise direction are attached to front end portions of the front side members 81, 81 using bumper stays 85, respectively.

As described above, inside the front compartment 80, the pair of left and right front side members (vehicle body constituent members) 81, 81 situated in the two respective sides of the front compartment 80 in the vehicle widthwise direction extend in the vehicle front-rear direction.

The front side members 81, 81 are each formed having a closed cross section which is shaped almost like a rectangle, and designed to be capable of being deformed crushingly by the input of load from front in the vehicle front-rear direction (a predetermined direction) at a time of front collision. In other words, the front side members 81, 81 each function as a shock absorber for absorbing a shock by being crushed in the vehicle front-rear direction (the predetermined direction) when load is inputted into the front side members 81, 81 from the front side in the vehicle front-rear direction (the predetermined direction).

In addition, the inverter 40 is fixed to either one of the front side members 81, 81. In the embodiment, the inverter 40 is fixed to the front side member 81, using a first bracket 130. In the embodiment, thus, the front side member 81 and the first bracket 130 correspond to parts of the vehicle body. Meanwhile, in a front portion of the inverter 40 is provided a protection cover 41 configured such that, when load is inputted into the protection cover 41 from the front in the vehicle front-rear direction, the protection cover 41 damps a shock from collision of the radiator core support 84 and the like, as relatively moving rearward, against the inverter 40.

In the embodiment, furthermore, the first bracket 130 is supported by a support bracket 120 connected to both the front side member 81 and the first bracket 130. The inverter (a vehicle apparatus) 40 is fixed to the first bracket 130, using a second bracket 140.

Figure 3A:
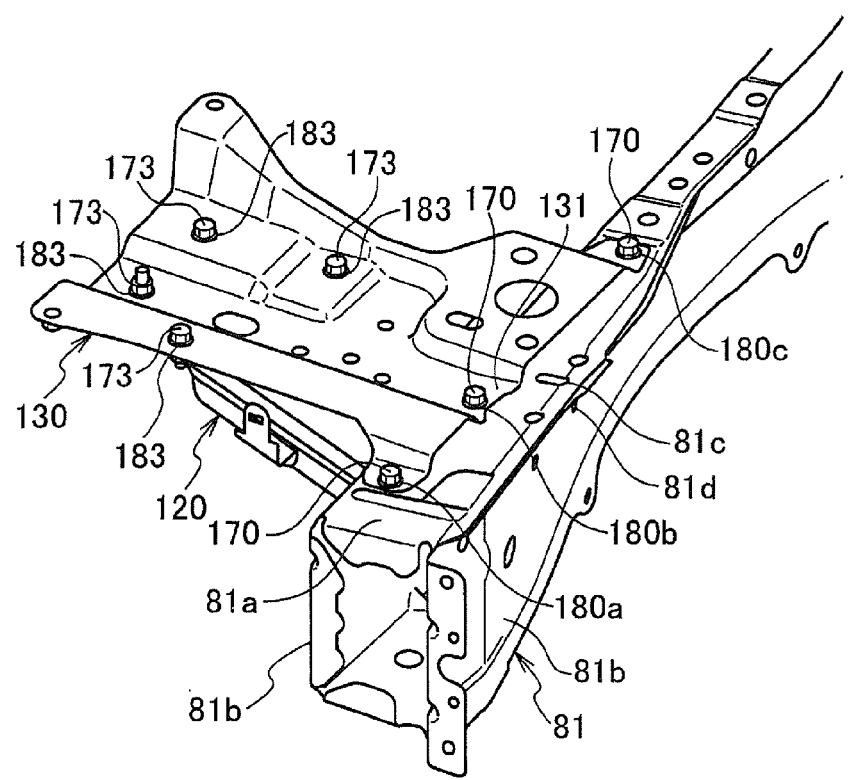
FIGS. 3A and 3B depict views showing how a first bracket is attached to a front side member according to the embodiment of the present invention.
Figure 3B:
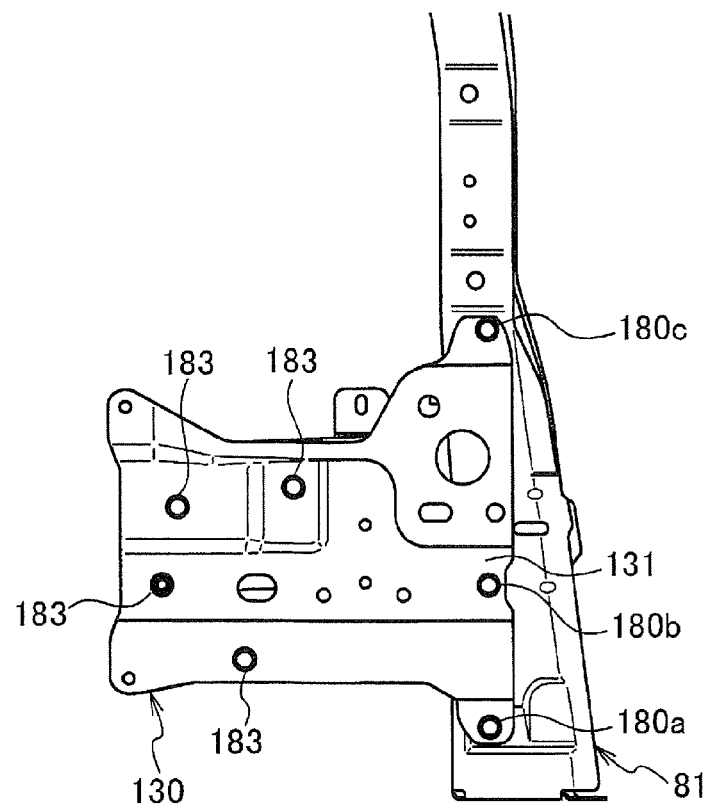
Figure 4:
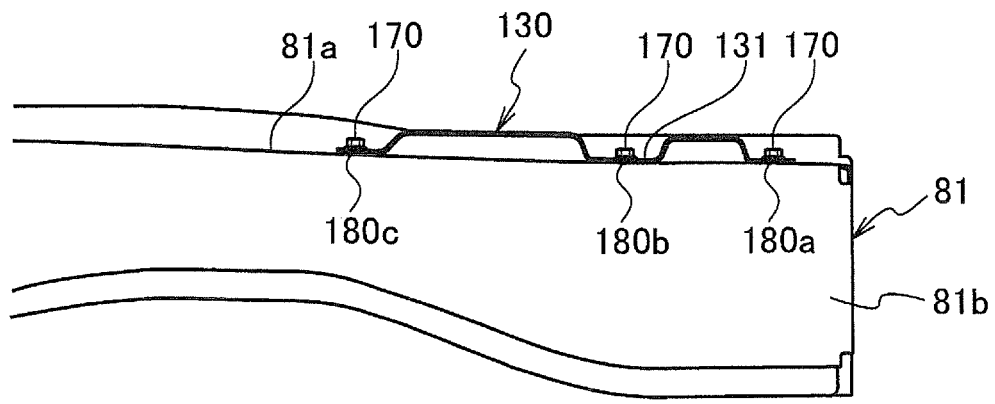
FIG. 4 is a cross-sectional side view partially showing how the first bracket is attached to the front side member according to the embodiment of the present invention.

In a plan view, the first bracket 130 is shaped nearly like a rectangle. The first bracket 130 is attached to the front side member 81 with one end of the first bracket 130 fixedly fastened to the front side member 81. In the embodiment, fastened portions 180*a*, 180*c*, 180*b* to be fastened to the front side member 81 are provided at two front and rear ends as well as the center of a one-end side of the first bracket 130, respectively. To put it concretely, as shown in FIGS. 3 and 4, the fastened portions 180*a*, 180*c*, 180*b* are formed by which the two front and rear ends as well as the center of the one-end side of the first bracket 130 are fastened to a top wall 81*a* of the front side member 81, using bolts 170.

As described above, the first bracket 130 is attached to the top wall 81*a* of the front side member 81 by the fastened portions 180*a*, 180*c*, 180*b*. In this respect, the attachment of the first bracket 130 to the front side member 81 is achieved so that, as shown in FIGS. 3A and 3B, the first bracket 130 may project inward in the vehicle widthwise direction.

Furthermore, a bent portion 131 is formed in the first bracket 130. The fastened portion 180*b* is formed in the bent portion 131 near the front side member 81. Since, as described above, the bent portion 131 is formed in the first bracket 130, it is possible to make the first bracket 130 on the side of the fastened portions 180*a* to 180*c* easily deformed crushingly in the vehicle front-rear direction, staring at the bent portion 131, when a load is inputted into the first bracket 130 from the front side in the vehicle front-rear direction. In the embodiment, two ends of the first bracket 130 in the vehicle front-rear direction near the front side member 81 are bent downward as well. As a whole, the first bracket 130 near the front side member 81 is shaped like waves. The fastened portions 180*a*, 180*c* are formed in the two bent end portions, respectively. In other words, a hollow protrusion extending inward in the vehicle widthwise direction is formed between each two neighboring fastened portions (namely, between the fastened portions 180*a*, 180*b*, and between the fastened portions 180*b*, 180*c*). This form facilitates the first bracket 130 on the side of the fastened portions 180*a* to 180*c* to be more easily deformed crushingly in the vehicle front-rear direction. Since as described above, the first bracket 130 on the side of the fastened portions 180a to 180c are designed to be easily deformed crushingly in the vehicle front-rear direction, the first bracket 130 on the side of the fastened portions 180a to 180c start to be deformed crushingly once the front side member 81 becomes deformed crushingly. This enables to inhibit the first bracket 130 from hindering the crushing deformation of the front side member 81 when a load is inputted into the front side member 81 from the front side in the vehicle front-rear direction.

It should be noted that: the bent portion 131 extends in the vehicle widthwise direction; and the front-rear distance of an inner area of the bent portion 131 in the vehicle widthwise direction is larger than that of the rest of the bent portion 131. In other words, the shape of the bent portion 131 is formed as if a sidewall extending in the vehicle front-rear direction existed halfway in the inner area of the bent portion 131 in the vehicle widthwise direction and the rest of the bent portion 131, as shown in FIGS. 3A and 3B. This makes it possible to inhibit a wider area of the bent portion 131 from being deformed crushingly when a load is inputted into the bent portion 131 from the front side in the vehicle front-rear direction. In the embodiment, as described above, the first bracket 130 is formed such that: the first bracket 130 on the side of the fastened portions 180a to 180c is easily deformed crushingly in the vehicle front-rear direction; and the inner part of the first bracket 130 away from the front side member 81 is less easily deformed crushingly.

The second bracket 140 is shaped almost like the small letter t in a plan view, and is attached only to the first bracket 130 of the front side member 81. For this reason, it is possible to make an influence of the second bracket 140 on the crushing deformation of the front side member 81 as small as possible.

In the embodiment, fastened portions 181a, 181b, 181c, 181d to be fastened to the first bracket 130 are respectively provided at two front and rear portions of the second bracket 140 closer to the front side member 81, and two front and rear portions of the second bracket 140 farther from the front side member 81. To put it concretely, the fastened portions 181a, 181b, 181c, 181d are formed by which the two front and rear portions of the second bracket 140 closer to the front side member 81, and the two front and rear portions of the second bracket 140 farther from the front side member 81 are fastened to the first bracket 130 using bolts 171.

Figure 5A:
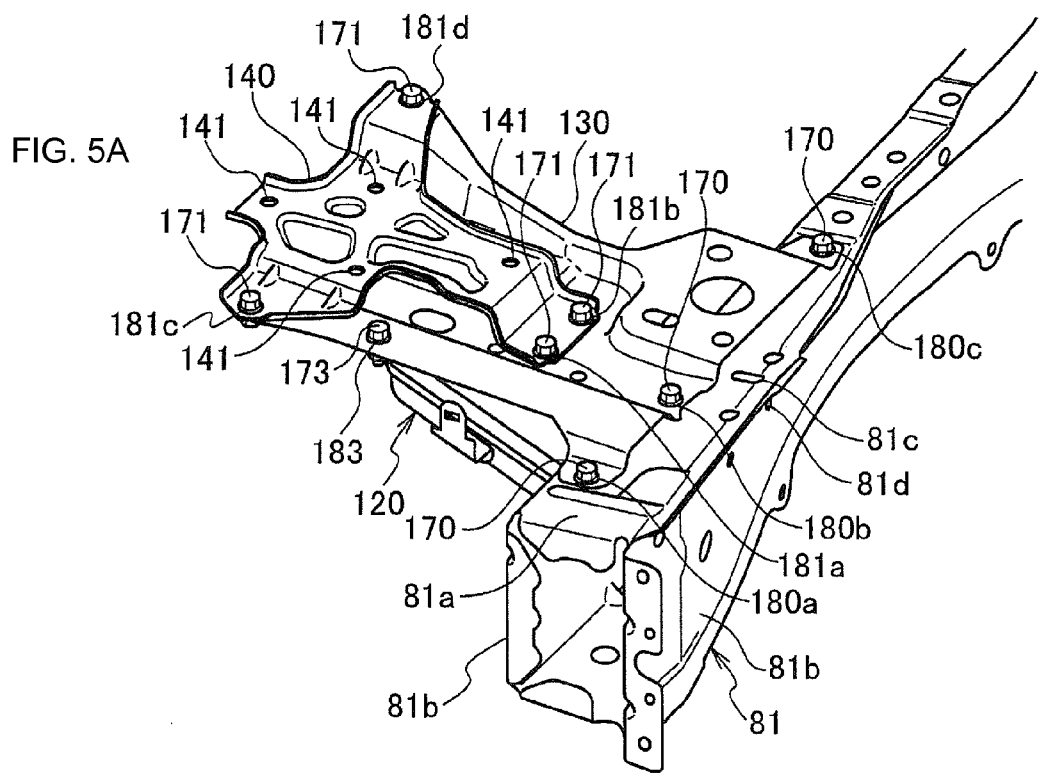
FIGS. 5A and 5B depict views showing how a second bracket is attached to the first bracket according to the embodiment of the present invention.
Figure 5B:
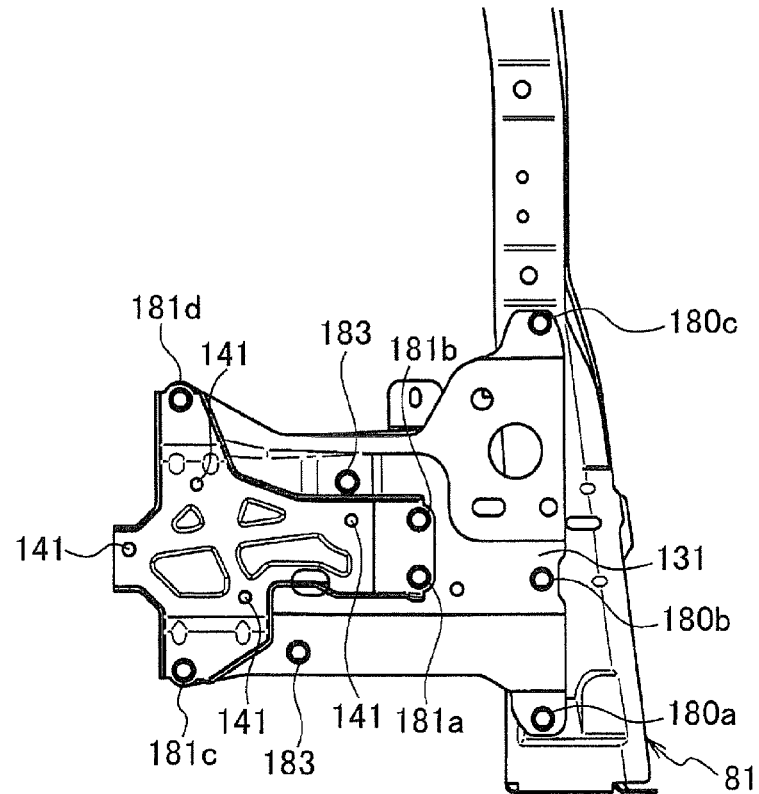
Figure 6:
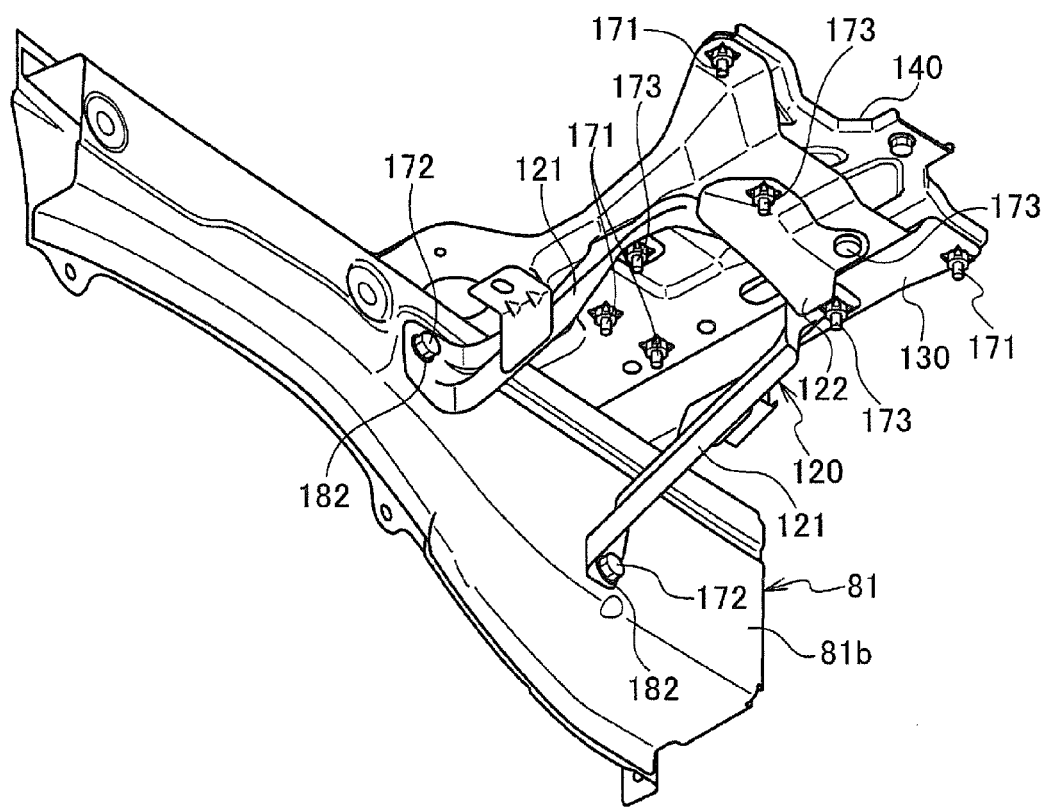
FIG. 6 is a perspective back view of a support bracket according to the embodiment of the present invention, which shows how the support bracket is attached.

In this manner, the second bracket 140 is attached to the first bracket 130 by the fastened portions 181a, 181b, 181c, 181d. In this respect, the attachment of the second bracket 140 to the first bracket 130 is achieved in a way that in a plan view, the second bracket 140 does not overlap the front side member 81, as shown in FIGS. 5A and 5B.

Furthermore, an almost flat area is formed in a central portion of the second bracket 140. Four insertion holes 141 to which to attach the inverter 40 are formed in the flat area.

The support bracket 120 is shaped almost like the letter U, and includes: leg portions 121, 121 respectively formed in its two ends; and a connecting portion 122 for connecting the leg portions 121, 121 together.

The support bracket 120 is fixedly connected to both the front side member 81 and the first bracket 130 by fixedly connecting the leg portions 121, 121 to the front side member 81, and the connecting portion 122 to the first bracket 130. In the embodiment, a fastened portion 182 to be fastened to the front side member 81 is provided to each of the tip ends of the leg portions 121, 121. To put it concretely, the fastened portion 182, 182, which are away from each other in the vehicle front-rear direction, are formed, whereby the tip ends of the leg portions 121, 121 are fastened to an inner sidewall 81b of the front side member 81 in the vehicle widthwise direction, at an interval in the vehicle front-rear direction, using bolts 172. In this manner, the leg portions 121, 121 are attached to the front side member 81 by the fastened portions 182.

On the other hand, a fastened portion 183 to be fastened to the first bracket 130 is provided to each of four portions of the connecting portion 122. To put it concretely, the fastened portions 183 are formed by which the four portions of the connecting portion 122 are fastened to the first bracket 130, using bolts 173. In this manner, the connecting portion 122 is attached to the first bracket 130 by the fastened portions 183.

As a result of the attachment, the support bracket 120 is connected to both the front side member 81 and the first bracket 130 in an orientation where, in a front view, the support bracket 120 inclines inward and upward. The supporting of the first bracket 130 in this condition inhibits the first bracket 130 from being deformed downward due to the weight of the inverter 40 when the inverter 40 is fixed to the first bracket 130.

It should be noted that, in the embodiment, the fastened portions 182, 182 to be fastened to the front side member 81, which are formed in the support bracket 120, are respectively provided at the pair of leg portions 121, 121, and are disposed away from each other in the vehicle front-rear direction. In other words, the pair of leg portions 121, 121 are attached to the front side member 81 in a way that makes the pair of leg portions 121, 121 easily displaced relative to each other in the vehicle front-rear direction. Since the pair of leg portions 121, 121 are attached to the front side member 81 in this way, it is possible to make an influence of the support bracket 120 on the crushing deformation of the front side member 81 becomes as small as possible. Incidentally, the number of leg portions may be other than two.

In the embodiment, an inverter attachment unit 150 is formed in advance by fixing the inverter 40 to the second bracket 140. Thereby, the fixing of the inverter 40 to the first bracket 130 as a part of the vehicle body is achieved by attaching the second bracket 140 of the inverter attachment unit 150 to the first bracket 130.

Figure 8:
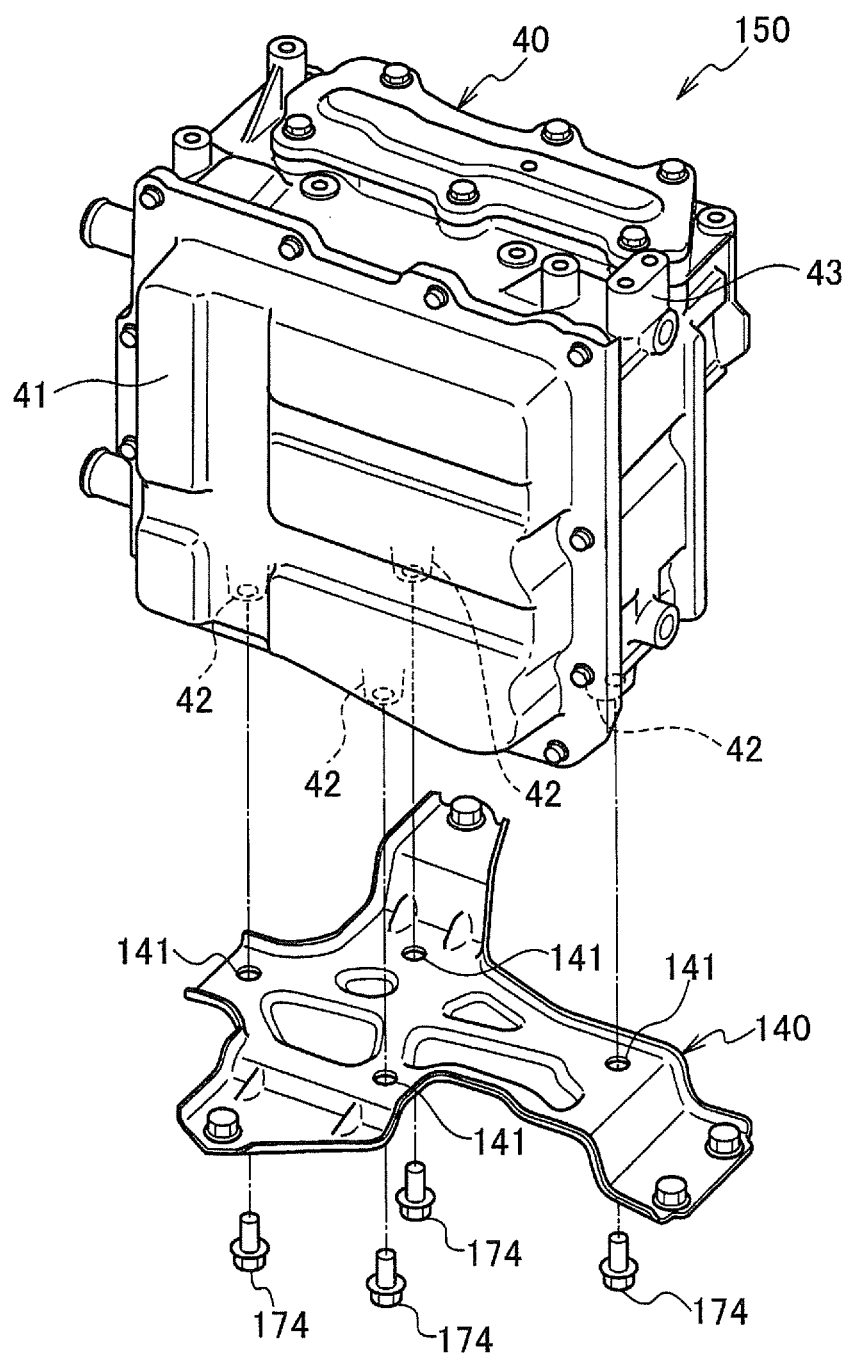
FIG. 8 is an exploded perspective view showing an inverter attachment unit according to the embodiment of the present invention.

To put it concretely, as shown in FIG. 8, a lower portion of the inverter 40 is provided with attachment bosses 42 at its parts corresponding to the insertion holes 141 formed in the second bracket 140, respectively. Thereby, the inverter attachment unit 150 is formed by inserting bolts 174 into the respective insertion holes 141 from the back surface of the second bracket 140 with the insertion holes 141 overlapping the attachment bosses 42.

All the insertion holes 141 are situated more inward in the vehicle widthwise direction than the fastened portions 181a, 181b, thereby fastening the second bracket 140 to the first bracket 130. In other words, in a plan view, the insertion holes 141 are formed at positions not overlapping the front side member 81. Furthermore, in the embodiment, as shown in FIGS. 7A and 7B, the inverter 40 itself is also placed more inward in the vehicle widthwise direction than the fastened portions 181a, 181b, thereby fastening the second bracket 140 to the first bracket 130. Thus, the inverter 40 is fixed to the first bracket 130 using the second bracket 140 such that, in a plan view, the inverter 40 does not overlap the front side member 81.

Since the inverter 40 is fixed to the second bracket 140 in this way, a space is formed outward of the inverter 40 in the vehicle widthwise direction (between the inverter 40 and the front side member 81). In the embodiment, the auxiliary battery 60 is placed, using this space. In other words, in the embodiment, the inverter 40 is placed in the inner side in the vehicle widthwise direction, while the auxiliary battery 60 is adjacently placed outward of the inverter 40 in the vehicle widthwise direction.

In the embodiment, the auxiliary battery 60 alone forms an auxiliary battery attachment unit 160, and the auxiliary battery attachment unit 160 is adjacently fixed to the outside of the inverter 40 in the vehicle widthwise direction. Incidentally, the auxiliary battery attachment unit 160 may be formed by attaching a bracket and the like to the auxiliary battery 60, and thus fixed there.

The auxiliary battery 60 includes an auxiliary battery body 61 on which a positive terminal 61*a* and a negative terminal 61*b* are formed. The auxiliary battery 60 further includes: a bottom plate 63 on which to place the auxiliary battery body 61, and which is fixed to the first bracket 130; and a protective case 62 provided so as to surround the periphery of the auxiliary battery body 61. Thus, when fixed to the inverter 40 and the front side member 81 using a fixing member 64, the auxiliary battery 60 (the auxiliary battery attachment unit 160) is attached to the front side member 81 so that the auxiliary battery 60 may be adjacent to the inverter attachment unit 150.

In the embodiment, the fixing member 64 includes: a holding member 65 configured to hold the auxiliary battery 60 (the auxiliary battery attachment unit 160) from above; and a fastening rod 66 connected to the holding member 65.

Furthermore, the holding member 65 is fixed to the inverter 40 by fastening an end (an inverter 40-side end portion) 65*a* of the holding member 65 to an attachment boss 43, which is formed on an upper portion of the inverter 40, using bolts 175 with the end 65*a* overlapping the attachment boss 43. On the other hand, an upper end 66*a* of the fastening rod 66 is connected to the other end (a front side member 81-side end portion) 65*b* of the holding member 65. Incidentally, a lower end 66*b* of the fastening rod 66 is formed in a bent manner. In addition, the fastening rod 66 is locked onto the front side member 81 with the bent portion of the lower end 66*b* inserted into an elongated hole 81*c* formed in the top wall 81*a* of the front side member 81, and with a tip end of the lower end 66*b* inserted into an insertion hole 81*d* formed in an outer sidewall 81*b* of the front side member 81 in the vehicle widthwise direction.

When, in such a state, a fastening nut 190 is screwed onto the fastening rod 66 from the upper end 66*a* of the fastening rod 66 and the auxiliary battery 60 (the auxiliary battery attachment unit 160) is fastened by the fastening nut 190, the auxiliary battery 60 (the auxiliary battery attachment unit 160) is fixed to the inverter 40 and the front side member 81.

Figure 9A:
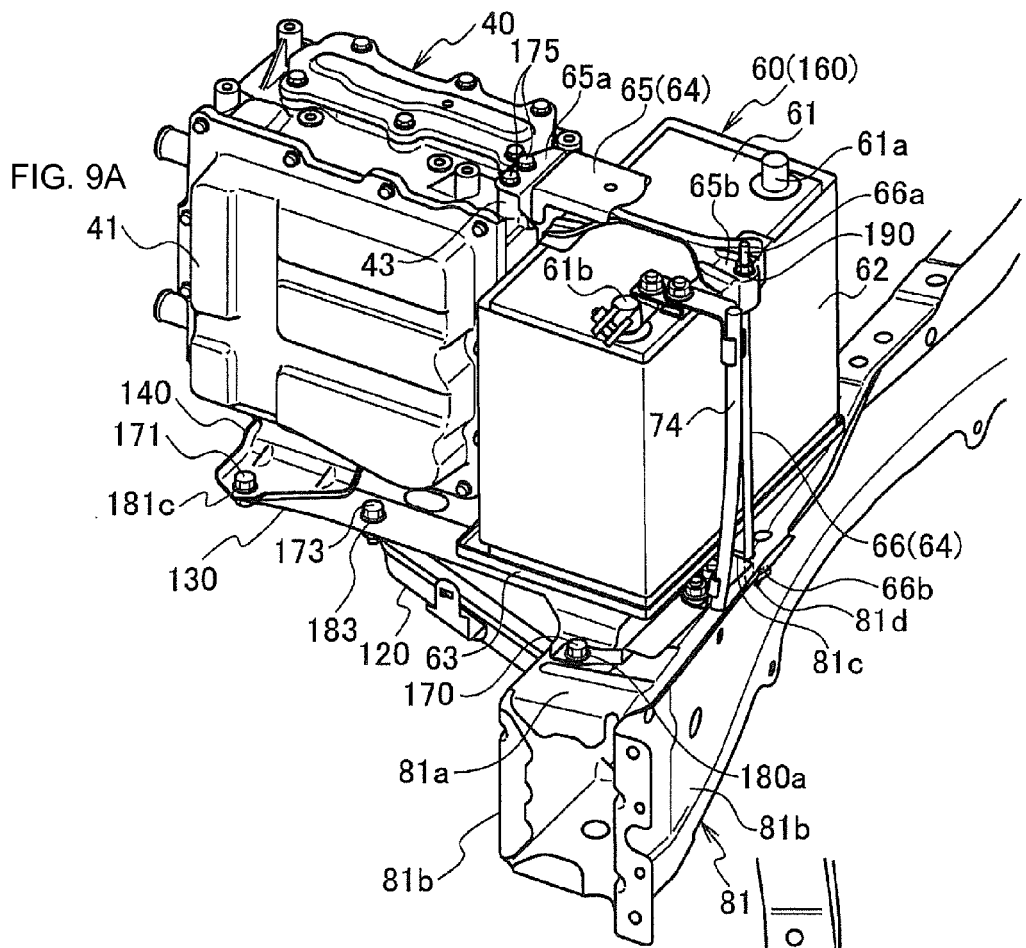
FIGS. 9A and 9B depict views showing how an auxiliary battery is attached adjacent to the inverter according to the embodiment of the present invention.
Figure 9B:
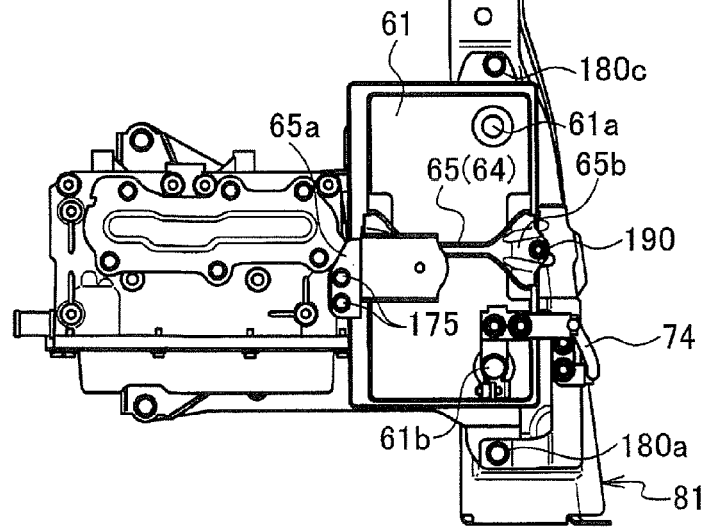

In addition, in the embodiment, as shown in FIGS. 9A and 9B, the negative terminal 61*b* is grounded to the front side member 81 using a fourth harness 74.

Meanwhile, a general procedure for detaching the inverter 40 (the inverter attachment unit 150) from the vehicle body starts with detaching the auxiliary battery 60 (the auxiliary battery attachment unit 160) from the vehicle body. For this reason, a desirable structure is that which does not allow the inverter attachment unit 150 to be detached from the vehicle before the auxiliary battery attachment unit 160 is detached from the vehicle body.

With this taken into consideration, the embodiment employs a design in which, when the auxiliary battery attachment unit 160 is attached to the first bracket 130, attachment portions by which the inverter attachment unit 150 is attached to the first bracket 130 is covered with the auxiliary battery attachment unit 160.

Figure 10:
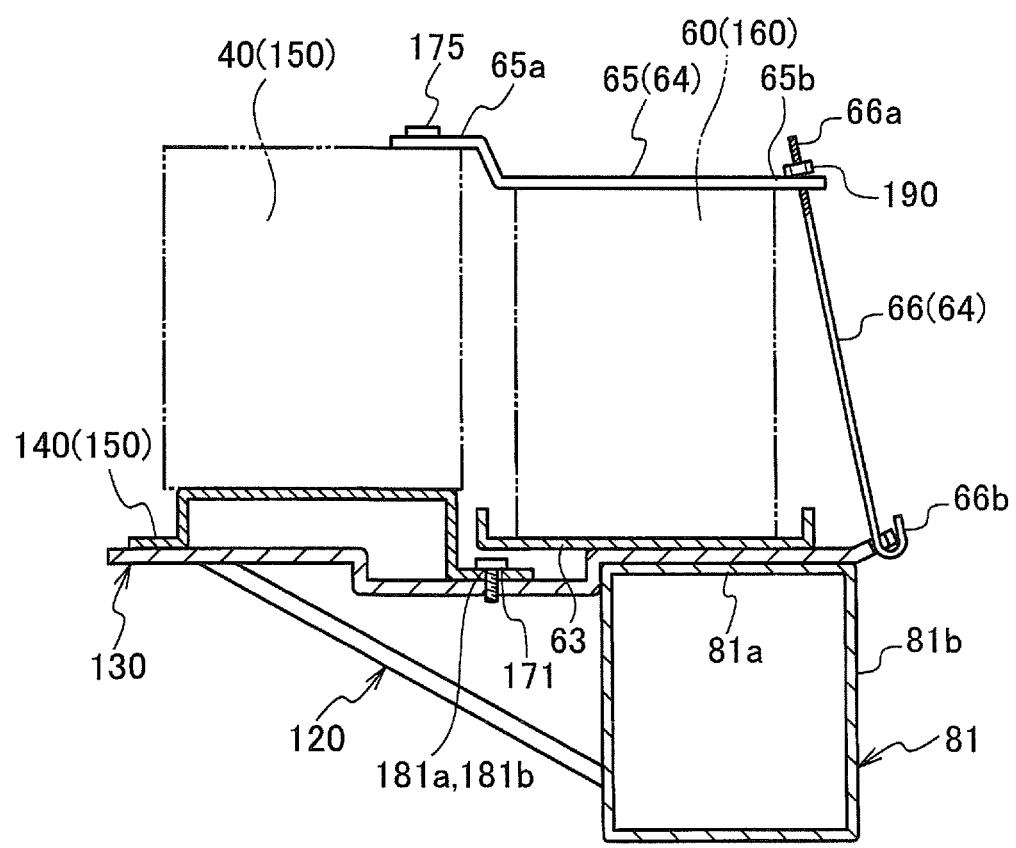
FIG. 10 is a front view schematically showing how the auxiliary battery is attached adjacent to the inverter according to the embodiment of the present invention.

To put it concretely, as shown in FIG. 10, of the fastened portions 181*a*, 181*b*, 181*c*, 181*d* by which the inverter attachment unit 150 is fastened to the first bracket 130, the fastened portions 181*a*, 181*b* located in the inner side in the vehicle widthwise direction are designed to be covered with the auxiliary battery attachment unit 160. In other words, the embodiment has the multiple (four) fastened portions by which the inverter attachment unit 150 is fastened to the first bracket 130, and at least one fastened portion is designed to be covered with the auxiliary battery attachment unit 160 (the bottom plate 63 in the embodiment).

This makes it possible to check the inverter attachment unit 150 from being detached while the auxiliary battery attachment unit 160 remains attached.

Furthermore, the fastened portions 181*a*, 181*b* are designed to be exposed only after the auxiliary battery attachment unit 160 is detached while the auxiliary battery attachment unit 160 released from being fixed by the fixing member 64, and with the negative terminal 61*b* released from being grounded to the front side member 81. In other words, the inverter attachment unit 150 is designed to be capable of being detached only after the auxiliary battery attachment unit 160 is detached (the auxiliary battery 60 stops supplying the electric power to the inverter 40). This makes it possible to check the inverter from being replaced while the auxiliary battery 60 continues supplying the electric power to the inverter 40. For this reason, it is possible to check the wires and circuit of the inverter from being short-circuited by mistake during the work of replacing the inverter, and accordingly, to more securely check the inverter from becoming broken.

As described above, in the embodiment, the auxiliary battery attachment unit 160 is designed to be attached to the first bracket 130 (the vehicle body) so that the auxiliary battery attachment unit 160 may be adjacent to the inverter attachment unit 150. In this respect, the attachment portions (the fastened portions 181*a*, 181*b*) by which the inverter attachment unit 150 is attached to the first bracket 130 (the vehicle body) is designed to be covered with the auxiliary battery attachment unit 160. For this reason, it is possible to check the inverter attachment unit 150 from being detached while the auxiliary battery attachment unit 160 still remains attached. As a result, it is possible to detach the auxiliary battery attachment unit 160 and the inverter attachment unit 150 more securely by following the appropriate procedure.

It should be noted that, in the case where the vehicle apparatus attaching structure has the multiple attachment portions (the fastened portions 181*a*, 181*b*, 181*c*, 181*d*) by which the inverter attachment unit 150 are connected to the first bracket 130 (the vehicle body), at least one attachment portion may be covered with the auxiliary battery attachment unit 160.

In the embodiment, some (the fastened portions 181*a*, 181*b*) of the multiple attachment portions by which the inverter attachment unit 150 are connected to the first bracket 130 (the vehicle body) is designed to be covered with the auxiliary battery attachment unit 160. This makes it possible to detach the auxiliary battery attachment unit 160 and the inverter attachment unit 150 by following the appropriate procedure more securely, using the more simple structure.

Although the foregoing descriptions have been provided for the vehicle apparatus attaching structure of the present invention by showing the above-described embodiment as an example, the present invention is not limited to the embodiment, and various other embodiments may be employed within a scope not departed from the gist of the present invention.

For example, detailed specifications (shapes, sizes, layouts and the like) of the driving battery, the motor and others may be modified, depending on the necessity.

The present invention can provide the vehicle apparatus attaching structure capable of: inhibiting a decrease in the shock absorbing capability of the vehicle body component members; and concurrently more securely checking the vehicle apparatuses from becoming broken.

The invention claimed is:

1. A vehicle structure comprising:
   a vehicle body member to which a main bracket is attached;
   an inverter configured to convert direct-current electric power, supplied from an electric power supply unit, into alternating-current electric power;
   an auxiliary battery connected to the inverter, and configured to supply electric power to the inverter;
   an inverter attachment unit attached to the main bracket and spaced from the vehicle body member, the inverter mounted on the inverter attachment unit; and
   an auxiliary battery attachment unit attaching the auxiliary battery to the main bracket, the auxiliary battery positioned between the inverter and the vehicle body member and adjacent to the inverter,
   wherein a portion of the inverter attachment unit is positioned under the auxiliary battery attachment unit.

2. The vehicle structure according to claim 1, wherein
   a plurality of attachment portions are formed to attach the inverter attachment unit to the main bracket, and
   at least one of the plurality of attachment portions is positioned under the auxiliary battery attachment unit.

3. The vehicle structure according to claim 1, wherein positions of the inverter attachment unit and the auxiliary battery attachment unit only let the auxiliary battery be removed from a vehicle before the inverter is removed.

* * * * *